July 23, 1963

G. W. COOK 3,098,393

ANGULAR ACCELEROMETER

Filed June 9, 1961

INVENTOR.
GEORGE W. COOK

BY

B. L. Zaugarll
ATTORNEYS.

July 23, 1963  G. W. COOK  3,098,393
ANGULAR ACCELEROMETER
Filed June 9, 1961  4 Sheets-Sheet 2

INVENTOR.
GEORGE W. COOK
BY
B. L. Zangwill
ATTORNEYS.

July 23, 1963  G. W. COOK  3,098,393
ANGULAR ACCELEROMETER
Filed June 9, 1961  4 Sheets-Sheet 3

INVENTOR.
GEORGE W. COOK
BY
B. L. Zangwill
ATTORNEYS.

July 23, 1963 G. W. COOK 3,098,393
ANGULAR ACCELEROMETER
Filed June 9, 1961 4 Sheets-Sheet 4

INVENTOR.
GEORGE W. COOK
BY
B. L. Zaugart
ATTORNEYS.

United States Patent Office 3,098,393
Patented July 23, 1963

3,098,393
ANGULAR ACCELEROMETER
George W. Cook, 9 Morningside Ave., Yardley, Pa.
Filed June 9, 1961, Ser. No. 116,923
19 Claims. (Cl. 73—516)
(Granted under Title 35, U.S. Code (1952), sec. 266)

The invention described herein may be manufactured and used by or for the Government of the United States of America for governmental purposes without the payment of any royalties thereon or therefore.

This invention is directed to improved means responsive to angular accelerations.

An object of the invention is to provide a device responsive solely to angular accelerations; the device being markedly unaffected by extraneous accelerations such as those produced by vibrating machinery, and by motions in rectilinear planes.

Another object of the invention is to produce an angular accelerometer or sensor which is unaffected by the gravitational force field of the earth or of any other similar large body, which is unaffected by magnetic or electric fields, which has no inherent friction error, and which presents no mechanical suspension problems such as are present in the more conventional seismic-type accelerometers.

Still another object of the invention is to provide an angular accelerometer that responds extremely rapidly and accurately to angularly accelerations, and in a manner substantially free from transient or resonant oscillations.

A further object of the invention is to provide an accelerometer that senses changes in angular velocity with substantially no moving parts.

Basically, the novel accelerometer takes the form of a hollow loop, preferably circular. The loop is entirely filled with liquid except for a barrier transversely across it that completely blocks any circular flow of liquid past or through it, so that the annular space in the loop is abruptly discontinuous. Accordingly, an angular acceleration will be manifest as a relative increase of pressure of the liquid on one side of the barrier and a decrease of pressure of the liquid on the other side of the barrier because of the inertia of the liquid; that is, a differential pressure appears across the barrier because of the inertia of the liquid; and this pressure difference is put to use. In a preferred form of the invention a special arrangement of a barrier and diaphragm-type pressure responsive gages is used to obtain a response to angular acceleration. It is to be understood that the term "acceleration" includes negative as well as positive accelerations, the former being frequently known as deceleration.

Other objects and many of the attendant advantages of this invention will be readily appreciated as the same becomes better understood by reference to the following details and descriptions when considered in connection with the accompanying drawings in which like reference numerals designate like parts throughout the figures thereof, and wherein:

FIGURE 2 is a vertical elevational view of the accelerometer;

FIGURE 3 is a general plan view of the accelerometer, with parts broken away;

FIGURE 4 is an enlarged sectional view along the section line IV—IV of FIGURE 3;

FIGURE 5 is an enlarged view, partly in section, of a manifold structure that includes the barrier and pressure-responsive gages, and also includes other features;

FIGURE 6 is a side view of the manifold;

FIGURE 7 is a side view of the manifold at right angles to FIGURE 6, this view being partly in section;

FIGURE 8 is a sectional view substantially along the line VIII—VIII of FIGURE 5; and FIGURE 9 is a sectional view of a differential pressure gage utilizable in the accelerometer.

Figure 1:
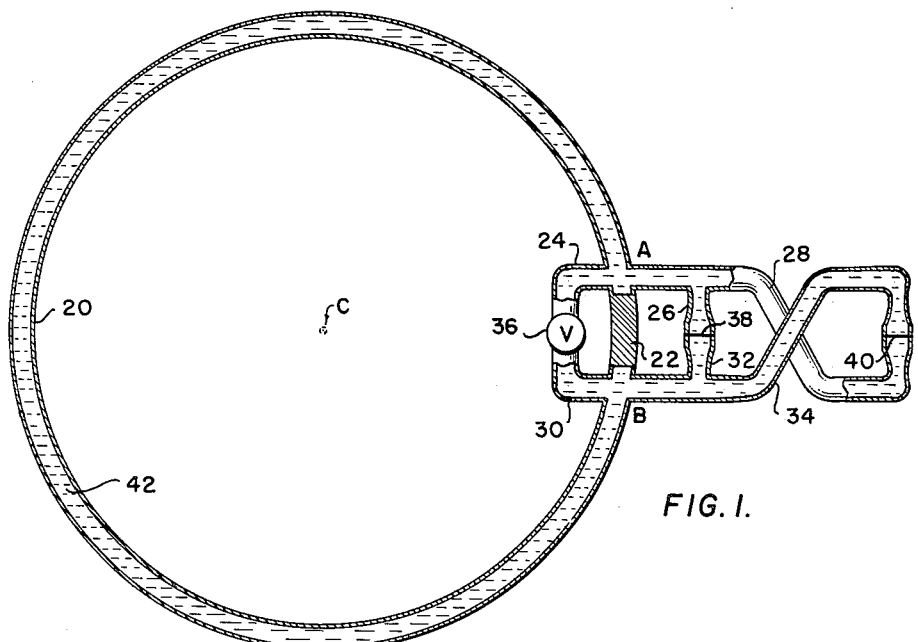
FIGURE 1 is a vertical sectional view, in simplified form, of a basic construction illustrative of an accelerometer or sensor embodying the invention.

In order to describe the principles and operation of an accelerometer or sensor in accordance with the invention as at present understood, reference is made of FIGURE 1 wherein the accelerometer shown comprises a hollow planar loop 20, preferably a metal tubing, for example, of steel, brass, or nickel, or alloys thereof, provided with a rigid barrier 22 rigidly fixed inside the loop at a point thereof in such a manner as to completely block the loop at a point therein.

Near one circumferential side of the barrier, the loop is provided with communicating branches 24, 26 and 28; and the other side has similar branches 30, 32 and 34. The branches 24 and 30 are connected to opposite sides of a valve 36. The branches 26 and 32 lead to opposite sides of a pressure-responive diaphragm 38 extending in a plane that in turn extends radially of the loop 20. The branches 28 and 34 are crossed and lead to opposite sides of a pressure-responsive diaphragm 40 similar in construction and arrangement to the diaphragm 38. The diaphragm 38 completely bars the exchange or flow of liquid between its associated branches 26 and 32; and the diaphragm 40 does the same for branches 28 and 34. These differential pressure gages are constructed so as to make negligible any flow of liquid in the loop 20.

It is noted that in the illustrative example of FIGURE 1 the diaphragms are symmetrically arranged with respect to the barrier 22, and that these parts are radially in line.

Constructionwise, the loop 20 may be said to have several parallel branches between spaced points A and B therein. A first of these branches comprises the branches 24 and 30, and the valve 36. A second of these branches comprises the branches 26 and 32 and the diaphragm 38. A third comprises the branches 28 and 34 and the diaphragm 40.

The system, comprising the loop 20, the valve 36 and the several parallel branches, are completely filled with any suitable incompressible liquid 42. For a quality instrument, a preferred liquid is silicone fluid or mercury. Water is satisfactory in some cases where corrosion of the parts by water is not a significant factor.

As for the materials used in the accelerometer, they should be such that they are compatible with the liquid used and of sufficient strength not to deform under the pressures developed in the operation of the instrument, that is, the tubing and barrier should be effectively rigid. The diaphragms must of course respond to the differential pressures across them, and to that extent there is a negligible displacement of liquid. This displacement is minimized and rendered negligible in the accelerometer described herein.

In order to explain the operation of the device, assume that the loop is rotating about its axis passing through its axis center C, the loop rotating in a plane perependicular to this axis. Assume further that the valve 36 is closed and that the filled loop 20 is subject to an angular acceleration. During the angular acceleration of the loop 20, the liquid 42 cannot flow relative to the loop, for the flow is prevented by the barrier so that a differential pressure is established across the barrier 22 and diaphragms 38 and 40, because of the inertia of the liquid. Any suitable means that measures this pressure across any one of the barriers to liquid flow will give an indication that will be a measure of the magnitude of the acceleration. Mathematically, the differential pressure P on the barrier 22 is given by the equation:

(1) $$P=\frac{F}{A}=\frac{2\pi r^2 dA\delta N}{A}$$

where:

$F$ = the force acting on the barrier
$r$ = the mean radius of the loop
$d$ = the mass density of the liquid filling the loop
$A$ = the cross sectional area of the tubing of the loop
$\delta$ = the angular acceleration of the loop about the center C
$N$ = the number of turns or loops of tubing, which in FIGURE 1 is unity.

From Equation 1 the angular acceleration is:

(2) $$\delta=\frac{P}{2\pi r^2 dN}$$

The factors of the denominator of the right hand side of Equation 2 are obviously parameters that depend on the physical characteristics of the construction and of the liquid used.

In the above equations, it is assumed that the diameter of the loop is much greater than the inside diameter of the tubing. A ratio of at least 100 to 1 will provide satisfactory correspondence to the equation. It is also assumed that there is practically no displacement of liquid relative to the tubing.

The Formulas 1 and 2 expressed above do not apply to devices wherein any significant mass flow of the liquid occurs.

The reason for this requirement of negligible flow is that I have found that any flow of the liquid in the loop 20 will introduce frictional losses in the liquid which cause changes in the magnitude and time relationship of the differential pressure itself which is under observation, and thus, the angular accelerometer will not truly indicate angular acceleration when flow of the liquid in the loop 20 is permitted to occur. Moreover, I have found that any such frictional losses arising from flow tend to be non-linear and to be in time phase relationship with the undesired flow, and this flow is usually out-of-phase with the angular acceleration desired to be measured. In addition to the frictional losses, there are hydrodynamic or turbulence losses arising from the liquid flow which occur at points of abrupt change in direction or abrupt change in cross sectional area of the tubing, such as at the points of connection to the pressure-responsive devices. As a result, any such undesired flow of liquid in the loop 20 introduces non-linear, out-of-phase errors and causes a lag in response of the instrument and limits the frequency response of the accelerometer.

Accordingly, this requirement for avoiding flow of the liquid in the loop 20 is critical because such flow limits the useful frequency range of the angular accelerometer in measuring rapid changes in angular acceleration. Moreover, the frequency response of the angular accelerometer must be substantially higher than the required highest frequency to be measured so as to avoid phase shifts in measured output. Consequently, the diaphragms 38 and 40 have a small area exposed to the liquid and are very stiff, i.e., have very little compliance, so that they deflect by only a very minute amount in responding to the largest pressure differential desired to be measured, and so the resultant mass flow of the liquid in the loop is negligible, thus providing a frequency response which encompasses the useful measurement range for most practical structures.

There is a limit to the desired upper level of frequency response required of an angular accelerometer embodying this invention because it is desired to measure the angular acceleration of practical sectionalized structures and above an upper frequency level of 120 cycles per second I find that the various parts of a sectionalized structure begin to move in different modes arising from local deformations. Usually it is not desired to measure the angular accelerations resulting from local deformation, which usually are not characteristic of the movement of the structure as a whole. Moreover, in this angular accelerometer the magnitude of the output voltage produced by a constant angular acceleration increases as the square of the repetition frequency of the exciting force. Accordingly the higher frequencies arising from local deformations, which are not of interest, tend to produce large output signals which would mask or swamp out the desired signals. Thus, small restrictions are placed closely adjacent to opposite faces of the diaphragm. These restrictions damp out any undesired very high frequency response of the diaphragm above 120 cycles per second. Also, these restrictions protect the diaphragm from pressure peaks which might arise from high rates of change of localized angular acceleration.

I have found that an angular accelerometer embodying the present invention provides a continuous response to angular acceleration and instantaneously responds to changes in angular acceleration without lags in response.

In addition, I have found experimentally that in an angular accelerometer as described in connection with FIGURES 2–9 there is no after-ringing following transient excitation. For example, if the angular accelerometer as shown in FIGURES 2–9 is struck a sharp blow with a wooden dowel, the angular accelerometer does not "ring" or resonate. My theory for explaining this observed desirable characteristic is that the restrictions closely adjacent to opposite sides of the diaphragm prevent after-ringing by acoustical energy absorption. But, regardless of whether or not this theory is correct, there is found to be no observable after-ringing of the angular accelerometer of FIGURES 2–9 resulting from transient excitation.

The valve 36 is inserted in order to protect the diaphragms. It is closed only during measuring operations. It is otherwise kept in open position so as to permit liquid flow in the loop during, for example, transportation and installation of the device, in order to protect the diaphragms against breakage. The valve is also open when the accelerometer is being filled or emptied, as subsequently explained. It is immaterial in which plane the loop lies. It can be horizontal or vertical or otherwise, and it will respond to the component of angular acceleration in its plane.

In the arrangement shown in FIGURE 1, the diaphragms are horizontal. This means that each diaphragm is "weighted" by gravity, thus creating an indication of pressure that is independent of angular acceleration. The second diaphragm and crossing branches compensate for this effect completely. In addition, the desired differential pressure is measured twice, once by each diaphragm, so that the signal to external noise ratio can be increased by a factor or two by suitable additive connections from the gages. That is, the electrical outputs from the two gages are added together by connecting the two gages in series aiding relationship in the measuring circuit.

Figure 2:
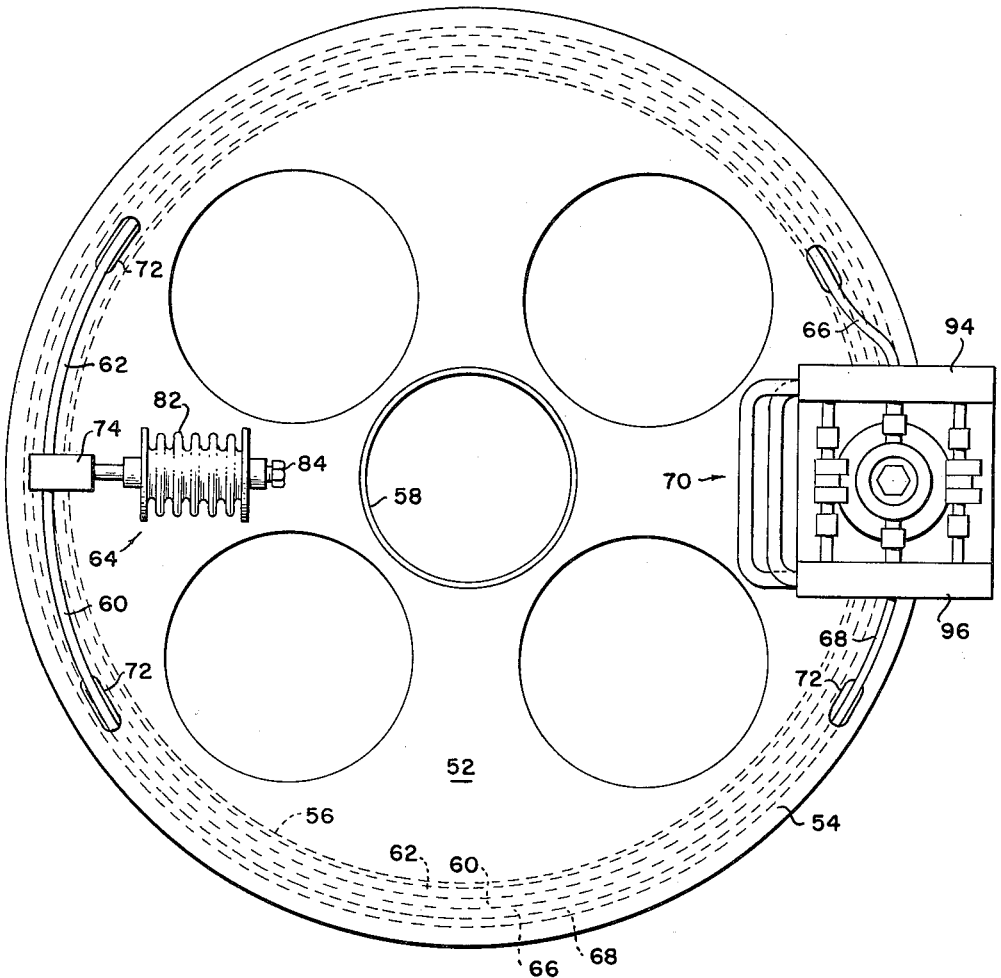
Figure 3:
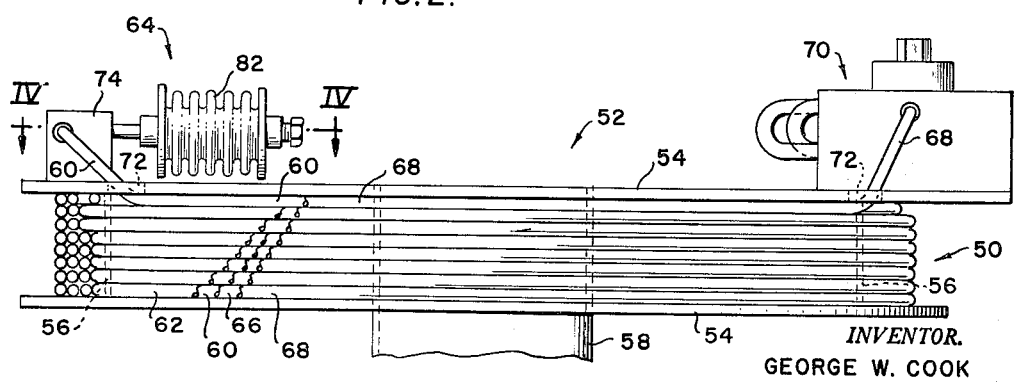

FIGURES 2–8 show a working form of the accelerometer for use on a shaft. Referring to FIGURES 2 and 3, a loop 50 comprises a plurality of helically wound turns of tubing arranged in four layers on a spool 52. The spool 52 has end discs 54, an outer tube 56 on which the tubing is wound, and an inner tube 58 which tightly fits or may be secured to the shaft. The intermediate layers of the tubing are interrupted at a point to provide two ends 60 and 62 that fit into a metal bellows assembly 64. Diametrically opposite the bellows, the starting and finishing ends of the tubing provide two ends 66 and 68 that fit into a manifold 70 built to provide the branches, valve and other components indicated at the right of FIGURE 1. Holes 72 are provided in the disc 54 adjacent to the bellows structure 64 and to the manifold 70 through which the tubing ends may pass thereto.

Figure 4:
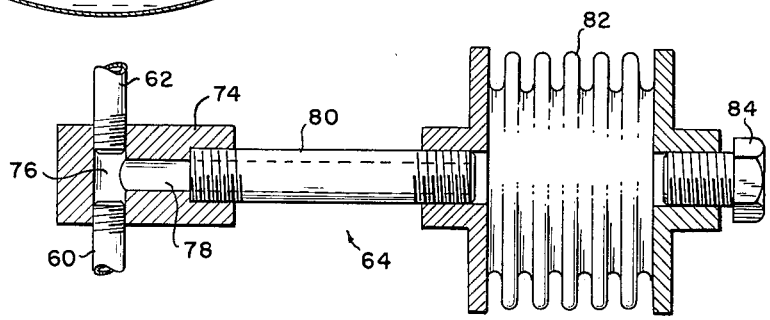
FIGURES 2–9 are views of a preferred form of the accelerometer or sensor, the several figures being somewhat simplified. In these figures.

The bellows structure is shown in FIGURE 4. It comprises a T-fitting 74 secured to one of the discs 54 and provided with a hole 76 which receives the tubing ends 60 and 62, thereby restoring the continuity of the tubing loop. A hole 78 in the leg of the fitting perpendicularly meets hole 76, and receives an end of a nipple 80, the other end of which is secured to an end plate of a bellows 82. The other end plate of the bellows is provided with a threaded hole for a removable pipe plug 84. The plug 84 has a wrench-receiving head, and this plug 84 is fitted into the hole in the end plate of the bellows or removed therefrom. The bellows structure 82 accommodates the volumetric changes in the liquid in the system due to expansion and contraction of the liquid with changes in temperature.

The manifold 70, as shown in FIGURES 5-9, comprises a U-shaped housing formed with a base 92 and legs 94 and 96. The manifold also comprises a plug valve 98 secured to base 92 by bolts 100.

Figure 8:
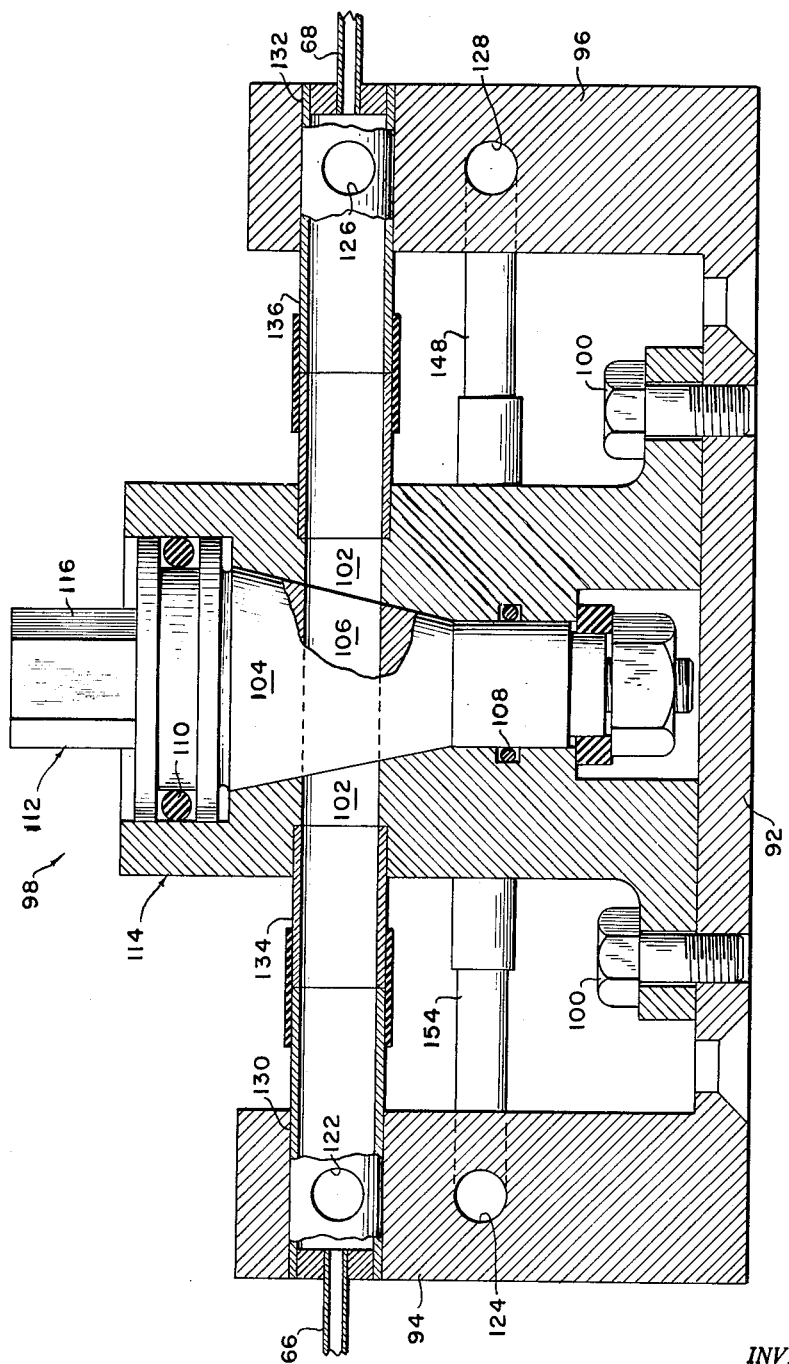

The valve 98 comprises ports 102 extending from both sides of a valve control member 104 having a straight passage 106 which interconnects the ports for free passage of liquid therebetween when the valve is in open position as shown in FIGURE 8. The valve control member can be turned to closed position in which the passage 106 is normal to ports 102. In this closed position of the valve, the control member 104 acts as a barrier equivalent to the barrier 22 of FIGURE 1. Accordingly, the valve 98 is functionally the equivalent of the valve 36 plus the barrier 22 of Figure 1.

The valve 98 should be liquid tight, except through the valve opening when in the open position. To this end the surfaces of control member 104 and its seat are carefully finished to fine tolerances, and O ring seals 108 and 110 are provided on both sides of the port 102 for further improving the seal between the rotating valve element and stationary case element 112 and 114, respectively, of the valve. The rotating element comprises the valve control member 104 and any suitable means, such as wrench-receiving head 116, for placing the valve selectively in open or closed position.

Figure 5:
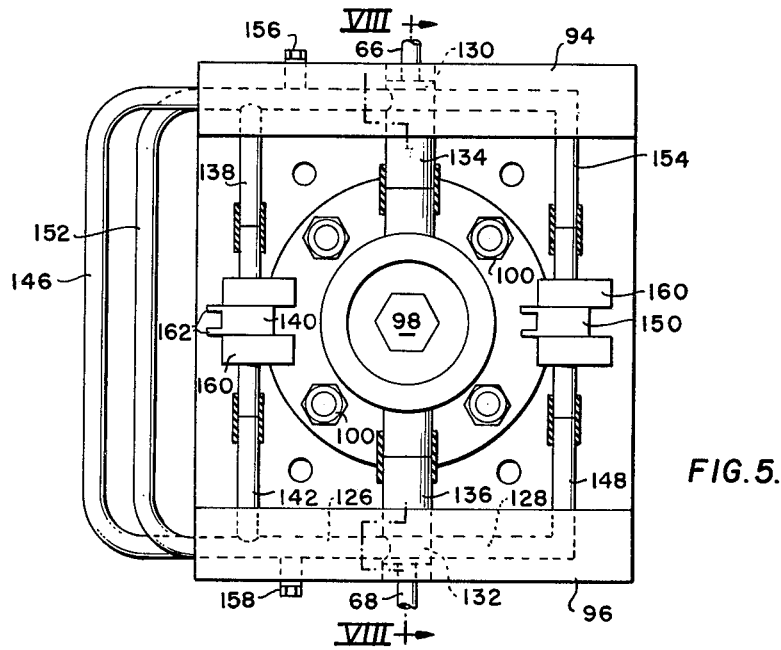
Figure 6:
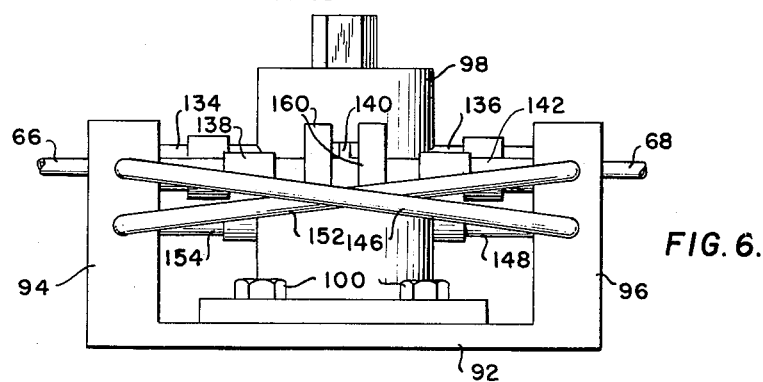
Figure 7:
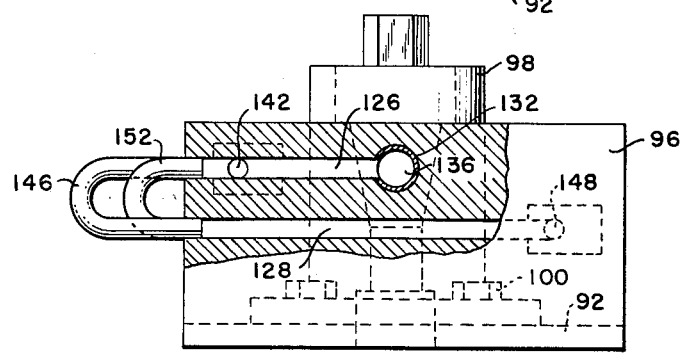

As better shown in FIGURES 5, 7 and 8, the leg 94 of the U-shaped housing has a pair of vertically spaced parallel holes or passages 122 and 124; and the leg 96 has a corresponding pair of vertically spaced parallel holes or passages 126 and 128. The leg 94 has an enlarged through hole or passage 130 centrally thereof which upper passage 122 meets; and leg 96 has a similar hole or passage 132 which upper passage 126 meets.

The passage 130 and the left port 102 of FIGURE 8 are in line and receive a tube structure 134. At one of its ends, the tube structure 134 receives tubing end 66. The tube structure 134 has a hole opening into passage 122, so that the tube structure 134 and associated port 102 provide a branch passage which is the equivalent of branch 24 and the associated barrier branch of FIGURE 1. Similarly, a tube structure 136 receives tubing end 68 and cooperates with the right port 102 and hole 132 of leg 96 to provide a branch passage which is the equivalent of branch 30 and the associated branch of barrier 22 of FIGURE 1. It is to be noted that the passages in the valve branches have much larger diameters than the remaining branches and passages of the manifold.

The equivalent of branch passage 26 of FIGURE 1 is provided in the manifold 70 of FIGURE 2 by a tube structure 138 of FIGURE 5, one end of which meets upper passage 122 in leg 94, and the other end of which meets a differential pressure gage 140 that includes a diaphragm equivalent to the diaphragm 38 of FIGURE 1. A similar arrangement that includes a tube structure 142 associated with the upper passage 126 of leg 96 provides a branch passage that extends to the other side of gage 140, so that this branch passage is equivalent to the branch 32 of FIGURE 1.

The equivalent of branch 28 of FIGURE 1 is provided in the manifold with a cross tube 146 that interconnects upper passage 122 of leg 94 and lower passage 128 of leg 96, and a tube structure 148 that interconnects the lower passage 128 with one side of a differential pressure gage 150 having a diaphragm that corresponds to diaphragm 40 of FIGURE 1. The equivalent of branch 34 of FIGURE 1 is provided in the manifold with a cross tube 152 that interconnects upper passage 126 of leg 96 and lower passage 124 of leg 94, and a tube structure 154 that interconnects lower passage 124 and the other side of pressure gage 150.

A plurality of removable plugs, represented by plugs 156 and 158 (FIGURE 5), open into the passages of legs 94 and 96 for filling and emptying purposes.

The differential pressure gages 140 and 150 may be any suitable type which meet the requirement for negligible flow of liquid in the tubing 50. A preferred form is along the lines of that described in Technical Note 2659 of the National Advisory Committee for Aeronautics. This report is dated April 1942 and is entitled "A Miniature Electrical Pressure Gage Utilizing a Stretched Flat Diaphragm." Gages of this kind are available commercially. They usually have relatively very small diameter inlets to the sides of their diaphragms. The diaphragms are small in diameter and are formed of steel which has been stretched outwardly in all directions under high tension so that only minute displacement of the diaphragm occurs under the condition of the largest angular acceleration, and consequently, under the differential pressure desired to be measured. Because of the different diameters of the inlets as compared to those of the connecting branches, adapters between the gages and the tubes leading to the gages are usually necessary when they are placed in a system such as required for the manifold 70. Such adapters are indicated at 160. The small inlets to the gages are an advantage since their diameters are much smaller than the tubing so that the diaphragms deflect with a negligible mass flow of liquid. With the gages described, a tubing having an inside diameter of about $\frac{1}{8}''$ to $\frac{3}{16}''$ is adequate.

The gages 140 and 150 have conductors extending therefrom that lead to any suitable indicating system. The aforesaid NACA technical note describes an adaptable system. The conductors are generally diagrammatically indicated in FIGURE 5 as coming through wires 162, there being a pair of relatively insulated conductors in each wire.

Figure 9:
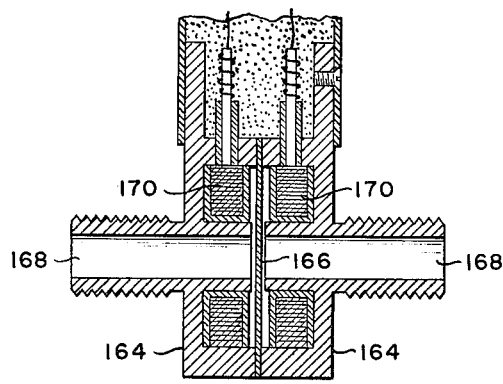

A form of pressure gage of the type referred to is shown in FIGURE 9. It comprises a pair of housing components 164 between which a diaphragm 166 is clamped in radially stretched condition. An inlet pipe connection 168 is provided to a small space on each side of the diaphragm. Each housing component is provided with an inductive coil 170. Movement of the diaphragm in response to differential pressure changes the gap differentially between the coils and the diaphragms. This changes the apparent inductance of the coils differentially for signalling purposes.

A suitable way to provide the radially stretched condition in the diaphragm 166 is to use a thin sheet of metal of considerably larger area than the desired final size of the diaphragm. Then a steel hoop is silver soldered to the sheet. After the silver solder has set, the hoop is heated along its entire perimeter, causing it to expand and thus to stretch radially the diaphragm material within the hoop. The two housing components 164 are then clamped against and silver soldered to the stretched area of the diaphragm material within the hoop, while the hoop is still hot. Thereafter, the excess diaphragm material and the hoop are trimmed away flush with the perimeter of the housing components 164 as the completed diaphragm is shown in FIGURE 9. As an example, it is noted that in a differential pressure gage as shown in FIGURE 9 which works to advantage in responding to the differential pressure while permitting only negligible flow, the diameter of the face of the diaphragm exposed to the liquid is 3/16 inch, and the maximum deflection of the center of the diaphragm is 300 microinches.

It is desirable, for most accurate results, to keep the cavities of the accelerometer completely filled with liquid and devoid of gas. To this end, care in filling the cavities is recommended. A satisfactory procedure comprises a preliminary treatment of the liquid used in any appropriate manner, as by heating under vacuum, to drive out entrained gas or water. The filling procedure then comprises opening the valve 98, removing the bellows plug 84 and the manifold plugs such as plugs 154 and 156, attaching a vacuum pump to the resulting opening in the bellows, immersing the device in the treated liquid or immersing the manifold and bellows, maintaining the immersion while the pump is started and allowed to operate until the cavities are all filled, restoring atmospheric or other desired pressure in the pumping system, and while the bellows and manifold are still immersed replacing the plugs and assuring an adequate seal with the sealing compound. The accelerometer can now be removed from the liquid in ready condition ready for installation and use, except for the plug valve 98 which should always remain open and is closed to provide the barrier only when the device is in actual use. It is understood, of course, that all joints in the device are carefully made and sealed so as as to be liquid tight.

The accelerometer of FIGURES 2–9 operates in accordance with the principles described with respect to FIGURE 1. The valve 98 in closed position provides the barrier that renders the multiturn loop 50 discontinuous thereat. Angular accelerations in the loop establish differential pressures across the diaphragms of gages 140 and 150. Deflections of the diaphragms provide electrical signals on the conductors of wires 162 that reflect the magnitudes of the differential pressures.

In a single or multiturn loop, it is desirable that the bellows structure be inserted therein at the center of symmetry of the loop, opposite the barrier, with the same amount of liquid in the two branches of the loop formed thereby.

It is to be noted that the term "loop" includes the manifold, and in that sense the tubing of the loop terminates at each side of the manifold or barrier.

Since there is practically no flow of liquid in the loop, the accelerometer or sensor has no internal frictional error. Furthermore, it presents no mechanical suspension problems within it, as do movable mass accelerometers. By virtue of the fact that no shock waves are reflected back and forth within the liquid, as indicated further above, an angular accelerometer embodying the present invention is substantially free from transient or resonant oscillations. Moreover, by virtue of the quick response and avoidance of lag, an angular accelerometer embodying the present invention provides accurate response to and measurement of changes in angular acceleration having frequency components up to 120 cycles per second.

The accelerometer as described is intended for mounting on a shaft, but obviously any suitable mounting means internally of the loop as described or externally of the loop may be used.

The device is utilizable in any plane; and by mounting a plurality of narrow accelerometers or sensors, such as a single or few turns, with the loops in mutually orthogonal planes or a loop in each plane of three mutually perpendicular planes, accurate three dimensional results may be obtained.

Although FIGURE 1 shows both of the diaphragms 38 and 40 in a common radial plane, it is noted that FIGURE 1 is an illustrative example and that other arrangements of the two differential pressure responsive devices are quite suitable for cancelling out response to a gravitational force field or rectilinear acceleration or similar extraneous acceleration. The three criteria for cancelling out response to extraneous acceleration are:

(a) The planes of the two diaphragms must be parallel (and this includes the arrangement as shown wherein the planes of both diaphragms are located in the same plane, i.e., they are co-planar, as shown in FIGURE 1).

(b) The two differential-pressure responsive devices must be located in close physical proximity one to the other, that is, they must be in close physical juxtaposition. However, it does not matter whether they are end-to-end side-by-side, one above the other, so long as they are close together as shown in FIGURE 5. For precise measurements the two differential-pressure responsive devices should be as close together as possible, the desire being to have them each positioned as nearly as possible in the same physical space.

(c) The two differential-pressure responsive devices should have the same physical characteristics, i.e., be a like in all respects.

In the explanation of the operation given further above as illustrative, it was assumed that the loop 20 was being subjected to angular acceleration centered about the axis C. It is to be noted that the angular accelerometer will measure the angular acceleration occurring about any axis parallel to the axis C. For example, assume that, the angular accelerometer of FIGURE 1 is being subjected to angular acceleration about an axis parallel to the axis C, e.g. an axis passing through a point outside of the loop 20, such as passing through the period following "FIG. 1." In such a situation the angular accelerometer is being subjected to rectilinear acceleration (translational acceleration) plus angular acceleration. However, the response to the rectilinear acceleration is cancelled out. Thus, the angular accelerometer does indicate the angular acceleration occurring about this assumed axis or any other axis parallel with the axis C.

Each differential-pressure responsive gage device as described herein as an illustrative example has a volumetric displacement of less than ten millionths of a cubic inch.

The illustrative examples of the present invention described herein show the loop as being circular, for the circular shape is the preferred shape. However, other shapes are also suitable, for example, elliptical, rectangular, polygonal, and the like. It is not necessary that the loop be regular, symmetrical, nor that it all lie within the same plane. For example, in certain installations an irregular shape may be used because of restrictions in available space. However, as discussed further above, this loop should be as rigid as practically possible, and a regular shape has advantages over an irregular shape for obtaining structural rigidity. A circular loop provides the greatest sensitivity in operation for a given length of tubing as will be seen from the Equations 1 and 2 above, for the sensitivity increases as the square of the mean radius "$r$." Any other loop shapes which most nearly approximate a circular shape will most nearly reach the sensitivity of the circular shape. This application is a continuation in part of application Serial No. 763,759, filed September 26, 1948.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. An angular accelerometer of a type described comprising a liquid filled loop having means for completely blocking the flow of liquid in said loop, said loop including a pair of spaced points on opposite sides of said blocking means, a pair of differential pressure responsive means each comprising a diaphragm, said diaphragms being similar in construction and similarly arranged with respect to said loop, each of said diaphragms having a first side toward a first of said points and a second side toward the second of said points, said loop comprising branch means connecting said first point to said first side of a first of said diaphragms and to said second side of the second of said diaphragms, said loop comprising another branch means connecting said second point to said second side of said first diaphragm and to said first side of said second diaphragm.

2. An invention as defined in claim 1 but further characterized by said loop having an axis, and said diaphragms extending substantially in a radial direction from said axis.

3. An accelerometer as defined in claim 1 wherein said loop comprises a bellows structure at a point equidistant from said pair of points.

4. An accelerometer as defined in claim 3 wherein said loop comprises multiturn tubing.

5. An accelerometer as defined in claim 1 wherein said means for completely blocking the flow of liquid in said loop includes a valve.

6. An accelerometer as defined in claim 5 wherein said loop comprises a bellows structure at a point in said loop opposite said valve.

7. An accelerometer as defined in claim 5 wherein said loop comprises multiturn tubing.

8. An angular accelerometer of a type described and responsive to angular acceleration about an axis, said angular accelerometer comprising a liquid filled loop at least partially encircling said axis, barrier means at opposite ends of said loop preventing the flow of liquid therein, said barrier means defining a pair of spaced points near opposite ends of said loop, a pair of differential pressure responsive means each comprising a diaphragm, said diaphragms being similar and having the same orientation with respect to said axis, each of said diaphragms having a first side toward a first of said points and a second side toward a second of said points, said loop comprising branch means connecting said first point to said first side of a first of said diaphragms and to said second side of the second of said diaphragms, said loop comprising another branch means connecting said second point to said second side of said first diaphragm and to said first side of said second diaphragm, and electrical means responsive to deflections of each of said diaphragms.

9. An angular accelerometer responsive to angular accelerations comprising tubing defining a liquid-filled loop, said loop having a mean diameter which is at least 100 times the inside diameter of the tubing, relatively rigid barrier means rigidly blocking said loop rendering the loop discontinuous at a point thereof for preventing the flow of liquid in said loop during operation of said accelerometer, and pressure difference responsive means exposed to liquid in said loop on opposite sides of said barrier means and continuously responsive to the differential in pressure of the liquid in said loop on opposite sides of said barrier means, said pressure difference responsive means permitting only negligible flow of the liquid in said loop.

10. Means responsive to angular accelerations in a plane perpendicular to a reference axis comprising a liquid filled curved member arranged in a path extending around said reference axis, a rigid barrier at opposite ends of said curved member completely blocking the flow of liquid within said member, a thin, stretched, pressure responsive diaphragm having opposite surfaces of said diaphragm exposed to liquid in said member near opposite ends of said curved member, said diaphragm limiting the flow in said member to a negligible quantity, whereby the flow of liquid in said curved member is extremely limited and said diaphragm is continuously responsive to the difference in pressure against opposite surfaces thereof, and electrical signal means for sensing the minute deflections of said diaphragm resulting from said difference in pressure exerted by the liquid against its opposite surfaces.

11. Means responsive to angular accelerations comprising a liquid filled loop, barrier means at a fixed position in said loop completely blocking the flow of liquid around said loop, said barrier means defining opposite ends of said loop, a pair of similar differential pressure responsive means each having a first and a second side and each being similarly positioned with respect to said loop, and connection means connecting a first side of one of said pair of similar differential pressure responsive means and the second side of the other of said pair to a first point in said loop near one of its ends and connecting the respective second and first sides of said pair to a second point in said loop near the other of its ends, whereby to cancel out any response to extraneous rectilinear accelerations.

12. The invention as defined in claim 11 wherein said barrier means comprises a valve having closed and opened positions and when in said closed position completely blocking any mass flow of liquid in said loop.

13. An accelerometer as defined in claim 11 wherein said loop comprises multiturn tubing, and a bellows structure is connected to said loop at a point substantially midway of said loop from said barrier means.

14. Means responsive to angular accelerations comprising a liquid-filled loop, barrier means for rendering said loop discontinuous at a point and for completely blocking the flow of liquid along said loop, a differential pressure gage comprising a diaphragm, a pair of pipe connections, one to a space on each side of said diaphragm, and electrical signal means responsive to deflections of said diaphragm, a first branch connection from said loop at one side of said point to a first of said pipe connections, a second branch connection from said loop at the other side of said point to the second of said pipe connections, said pipe connections having much smaller diameters than said branch connections.

15. An invention as defined in claim 14 wherein said barrier means includes a valve adapted to be fixedly closed during operation.

16. An angular accelerometer responsive to angular accelerations about an axis comprising a liquid-filled tubing passing around said axis; barrier means preventing the flow of liquid through said tubing; a pair of differential pressure gages, each comprising a diaphragm, said diaphragms being similar in construction and each extending substantially radially from said axis and electrical signal means responsive to deflections of said diaphragms; a pair of parallel branches connected between first and second points of said tubing on opposite sides of said barrier means, each of said parallel branches including one of said diaphragms; said parallel branches connecting corresponding faces of said diaphragms with said first and second points, respectively.

17. An angular accelerometer responsive to angular accelerations about an axis comprising rigid tubing following a path around said axis, liquid filling said tubing, rigid barrier means blocking opposite ends of said tubing for preventing the flow of the liquid therein, said path of said tubing having a mean diameter at least 100 times the inside diameter of said tubing, a liquid-filled branch connected to said tubing at two points, said points being near the opposite ends of said tubing, and differential-pressure-responsive means in said liquid-filled branch, said differential-pressure-responsive means having a volumetric displacement of less than ten millionths of a cubic inch, thereby preventing any significant liquid flow through said branch, whereby said accelerometer avoids frictional error due to liquid flow.

18. An angular accelerometer continuously responsive to angular accelerations comprising a loop completely filled with liquid, barrier means rigidly blocking said loop preventing any flow of liquid therein, said loop having a pair of differential pressure responsive means each connected to said loop on opposite sides of said barrier means, said pair of differential pressure responsive means having the same physical characteristics and being located in close physical proximity one to the other and being oriented in parallel relationship with corresponding first and second sides thereof facing in corresponding directions, said pair of differential pressure responsive means being responsive to said pressure differential with negligible flow of liquid in said loop, the first side of one of said pair of differential pressure responsive means and the second side of the other of said pair being connected to said loop on one side of said barrier means, and the respective second and first sides of said pair being connected to said loop on the other side of said barrier means.

19. An angular accelerometer responsive to angular acceleration about an axis, said angular accelerometer comprising a liquid-filled loop encircling said axis, barrier means at opposite ends of said loop preventing the flow of liquid therein, a pressure differential responsive gage including a thin, stretched diaphragm, said gage having a space adjacent to each face of said diaphragm, electrical signal means responsive to deflections of said diaphragm, a pair of connections, one of said connections extending from one end of said loop to one of said spaces and the other connection extending from the other end of said loop to the other of said spaces, and restrictions in said connections for damping out high frequency response of the diaphragm.

References Cited in the file of this patent
UNITED STATES PATENTS

| | | |
|---|---|---|
| 2,322,003 | Farmer | June 15, 1943 |
| 2,728,868 | Peterson | Dec. 27, 1955 |
| 2,927,290 | Baker | Mar. 1, 1960 |

FOREIGN PATENTS

| | | |
|---|---|---|
| 661,864 | Germany | June 29, 1938 |